Oct. 24, 1939.  J. S. IRVING  2,177,456
BRAKE
Filed Aug. 11, 1937
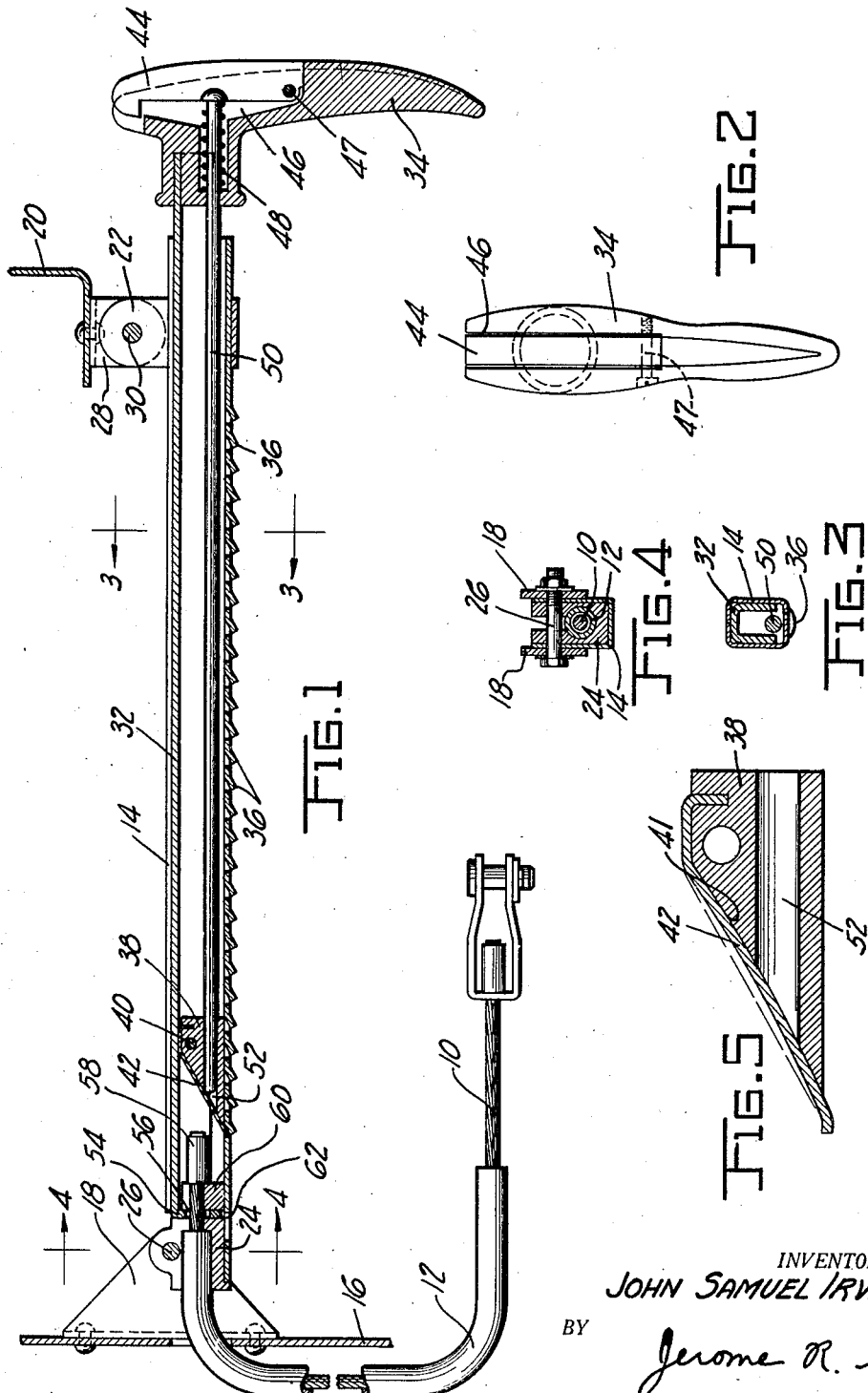
INVENTOR.
JOHN SAMUEL IRVING
BY
Jerome R. Cox
ATTORNEY.

Patented Oct. 24, 1939

2,177,456

UNITED STATES PATENT OFFICE 2,177,456

BRAKE

John Samuel Irving, Birmingham, England, assignor to Bendix Products Corporation, South Bend, Ind., a corporation of Indiana Application August 11, 1937, Serial No. 158,546
In Great Britain September 10, 1936

13 Claims. (Cl. 74—502)

The present invention relates to hand operated brakes of the kind in which the brake may be left in the applied position to hold a vehicle when it is parked.

An object of the invention is to provide a unitary demountable parking brake operating device.

Another object is to provide a parking brake operating device in which the force necessary to hold the brake applied is absorbed by the device and not by the parts of the vehicle on which the device is mounted. A third object is to provide a spring steel ratchet pawl having great strength. To accomplish the above and other objects I provide a brake operated by a flexible cable contained in, or combined with, a tension or compression member, means being provided for holding the brake in the applied position after it has been operated; which means are so arranged that the force required to hold the brake in the applied position is taken by the cable and its tension or compression member and not by the mountings on the vehicle.

The invention may further consist of the combination with such an arrangement of the cable and its conduit member and the means for holding the brake in applied position, of a part fixed with relation to the conduit and a part sliding with respect thereto and connected to the handle or lever and a ratchet or clutching device between these parts which is releasable by means associated with the handle or lever.

It is preferred to operate the cable by a pull handle or knob and this operating means may be mounted on any convenient part of the vehicle; but where the invention is applied to a motor car we prefer to mount it on the dash board.

An advantage of the present invention is that the dash board, or other part of the vehicle to which the brake operating means are mounted, is not subjected to stress by the brake operating means; because the force required to hold the brakes in the applied position is taken by the cable and its tension or compression member.

Other objects and desirable particular combinations and arrangements of parts will be apparent upon reference to the following detailed description of one embodiment of the invention shown in the accompanying drawing in which:

Figure 1 is a vertical longitudinal section of my novel parking brake applying device shown in mounted position with relation to fragmentary parts of a conventional automobile;

Figure 2 is an elevational view of the handle and trigger;

Figure 3 is a transverse sectional view on the line 3—3 of Figure 1;

Figure 4 is another transverse sectional view on the line 4—4 of Figure 1; and

Figure 5 is an enlarged sectional view of parts of Figure 1.

In the preferred construction shown in the drawing, the brake mechanism of a motor vehicle (not shown) is adapted to be operated by a flexible wire cable 10, which passes through a conduit 12, either comparatively rigid or flexible as required by the particular installation but in any case capable of withstanding a compressive stress. One end of the conduit 12 is fixed to the end of a tubular casing 14 of rectangular cross section, preferably pressed or bent up from sheet metal, which is mounted to the dash board or fire wall 16 of the vehicle by means of suitable brackets 18 and to the lower part of the instrument panel 20 by means of a suitable clip 20.

I employ a novel method of securing the conduit 12 to the casing 14 and the casing to the dashboard (see Figure 4). The brackets 18, comprising stamped angles riveted to the dash 16 provide spaced projections closely receiving the end of the casing 14. A casting 24, bored to receive the end of the conduit 12 and split to form a clamp, is fitted closely in the end of the casing 14 and a bolt 26 passes through alined openings in the brackets, casing and casting to clamp them all rigidly together.

The clip 22 is clamped about the casing 14 and secured to brackets 28 riveted or otherwise secured to the instrument panel 20 by another bolt 30. It will be noted that the bolts 26 and 30 provide pivots and that the clip 22 is adjustable longitudinally to enable my novel unit to be conveniently mounted in any desired position on automobiles of varying structures and proportions.

Slidably mounted in the tubular casing 14 is an inverted channel-shaped member 32 one end of which is fixed to the flexible cable 10, while the other end is fixed to an operating knob or handle 34 which is pulled to apply the brakes. The underside of the casing is provided with ratchet teeth 36 made by slitting the metal to form tongues and depressing the tongues which thus incline downwardly away from the rear or handle end of the casing.

A ratchet adapted to engage in these teeth is mounted in the channel member and consists of a die casting 38 secured to the channel member by a transverse pin 40 passing through alined openings in the casting 38 and the sides of the channel-member. The casting is formed with an inclined face 41 (see Figure 5), along which lies a spring steel pawl 42, formed by a spring blade one end of which is bent down and secured in the upper face of the casting 38. The pawl is made so that, due to its resiliency, it engages with its other end in the ratchet teeth 36 of the casing and prevents the channel member 32 sliding forwardly to release the brakes, while riding freely over the teeth when the channel member is moved in the opposite direction to apply the brakes. The inclined face 41 of the die casting is made slightly concave (see Figure 5) and the spring steel pawl is also made with an initial bend in the same direction. This insures that when load is taken by the spring pawl it will bend slightly toward the die casting and will then be fully supported throughout its length. A straight pawl under load might bend away from the cast support and be forced clear of the ratchet teeth.

In order to allow the pawl to be freed and the brakes released, a trigger 44 adapted to be pressed by the operator's thumb, is provided on the operating handle. This trigger consists of a small lever housed in a slot 46 in the operating handle, to which it is pivoted near its lower end by means of a screw 47. A compression spring 48 mounted round the end of a rod 50 and contained in the handle urges the end of this rod against the trigger 44. The other end of the rod passes through a hole 52 in the ratchet casting and lies against the underside of the pawl 42. Thus if the trigger is pressed this rod moves forward and lifts the pawl out of engagement with the rack.

A convenient method of attaching the end of the cable 10 to the channel member 32 is as follows: The end of the channel has a downwardly cranked portion 54 with a hole 56 through which passes the end of the cable. The cable has an enlarged end 58 which is prevented from passing back through this hole by a slit locking washer 60. To remove the cable the bolt 26 which clamps the brackets 18 on to the end of the casing 14 and conduit 12 is removed and the casing slid forward a small amount until the locking washer 60 comes opposite a slot 62 in the casing through which it is extracted. The cable and conduit can then be removed. An advantage of this construction is that it enables the cable and conduit to be disconnected, or attached, very readily without entirely dismantling the component.

The invention enables a convenient brake operating device to be provided and has the advantage that when the brake is applied the reaction is taken on the end of the conduit located in the dash board end fitting, and when applied and the ratchet or other catch engaged, the stress is entirely self-contained and the brake would still remain applied even if the component was detached from the dash board of the car.

While only one embodiment of my invention has been described in detail, it is not my intention to be limited by that embodiment or otherwise than by the terms of the appended claims.

I claim:

1. In a brake applying mechanism, a cable for applying the brakes, a compression member surrounding the cable, a tubular casing secured to the compression member, a member slidable within the casing and secured to the cable, a handle on the last-named member, means for holding, said last-named member against movement in one direction in said casing, and means in said handle for releasing the holding means, said holding means comprising a ratchet formed on the casing by slitting tongues on one face thereof and depressing them and a pawl secured to said last-named member and engageable with said rack.

2. In a brake applying mechanism, a cable for applying the brakes, a compression member surrounding the cable, a tubular casing secured to the compression member, a member slidable within the casing and secured to the cable, a handle on the last-named member, means for holding said last-named member against movement in one direction in said casing, and means in said handle for releasing the holding means, said holding means comprising a ratchet formed on the casing a casting secured to said last-named member and formed with an inclined face and a pawl blade secured to the casting and lying along the inclined face thereof and engaging said ratchet.

3. In a brake aplying mechanism, a cable for applying the brakes, a compression member surrounding the cable, a tubular casing secured to the compression member, a member slidable within the casing and secured to the cable, a handle on the last-named member, means for holding said last-named member against movement in one direction in said casing, and means in said handle for releasing the holding means, said holding means comprising a ratchet formed on the casing by slitting tongues on one face thereof and depressing them and a casting secured to said last-named member and formed with an inclined face and a pawl blade secured to the casting and lying along the inclined face thereof and engaging said ratchet.

4. In a brake applying mechanism, a cable for applying the brakes, a compression member surrounding the cable, a tubular casing secured to the compression member, a member slidable within the casing and secured to the cable, a handle on the last-named member, means for holding said last-named member against movement in one direction in said casing, and means in said handle for releasing the holding means, said holding means comprising a ratchet formed on the casing and a casting secured to said last-named member and formed with a slightly concave inclined face and a pawl blade secured to the casting and lying along the inclined face thereof and engaging said ratchet.

5. In a brake applying mechanism, a cable for applying the brakes, a compression member surrounding the cable, a tubular casing secured to the compression member, a member slidable within the casing and secured to the cable, a handle on the last-named member, means for holding said last-named member against movement in one direction in said casing, and means in said handle for releasing the holding means, said holding means comprising a ratchet formed on the casing and a casting secured to said last-named member and formed with a slightly concave inclined face and a pawl blade secured to the casting and lying along the inclined face thereof and engaging said ratchet, said pawl blade being bent in conformity with the concave face of the casting.

6. In a brake applying mechanism, a cable for applying the brakes, a compression member surrounding the cable, a tubular casing secured to the compression member, a member slidable within the casing and secured to the cable, a handle on the last-named member, means for holding said last-named member against movement in one direction in said casing, and means in said handle for releasing the holding means, said holding means comprising a ratchet formed on the casing, a casting secured to said last-named member and formed with an inclined face and a pawl blade secured to the casting and lying along the inclined face thereof and engaging said ratchet, said releasing means comprising a trigger pivoted in said handle and a rod one end of which is engaged by said trigger and the other end of which engages the under side of said pawl blade.

7. In a brake applying mechanism, a cable for applying the brakes, a compression member surrounding the cable, a tubular casing secured to the compression member, a member slidable within the casing and secured to the cable, a handle on the last-named member, means for holding said last named member against movement in one direction in said casing, and means in said handle for releasing the holding means, said holding means comprising a ratchet formed on the casing by slitting tongues on one face thereof and depressing them and a casting secured to said last-named member and formed with an inclined face and a pawl blade secured to the casting and lying along the inclined face thereof and engaging said ratchet, said releasing means comprising a trigger pivoted in said handle and a rod one end of which is engaged by said trigger and the other end of which engages the under side of said pawl blade.

8. In a brake applying mechanism, a cable for applying the brakes, a compression member surrounding the cable, a tubular casing secured to the compression member, a member slidable within the casing and secured to the cable, a handle on the last-named member, means for holding said last-named member against movement in one direction in said casing, and means in said handle for releasing the holding means, said holding means comprising a ratchet formed on the casing and a casting secured to said last-named member and formed with a slightly concave inclined face and a pawl blade secured to the casting and lying along the inclined face thereof and engaging said ratchet, said releasing means comprising a trigger pivoted in said handle, and a rod, one end of which is engaged by said trigger and the other end of which engages the under side of said pawl blade.

9. In a brake applying mechanism, a cable for applying the brakes, a compression member surrounding the cable, a tubular casing secured to the compression member, a member slidable within the casing and secured to the cable, a handle on the last-named member, means for holding said last-named member against movement in one direction in said casing, and means in said handle for releasing the holding means, said holding means comprising a ratchet formed on the casing and a casting secured to said last-named member and formed with a slightly concave inclined face and a pawl blade secured to the casting and lying along the inclined face thereof and engaging said ratchet, said pawl blade being bent in conformity with the concave face of the casting, said releasing means comprising a trigger pivoted in said handle and a rod one end of which is engaged by said trigger and the other end of which engages the under side of said pawl blade.

10. In a vehicle brake applying mechanism, a cable for applying the brakes, a compression member surrounding the cable, a tubular casing, a slotted casting receiving said compression member and received by one end of the casing, brackets secured to the vehicle and receiving said end of the casing between them, said brackets, casting and casing being formed with alined openings, a bolt passing through said openings and securely clamping the brackets, casing, casting, and compression member together, a member secured to the cable and slidable in the casing, and a handle secured to said last-named member.

11. In a vehicle brake applying mechanism, a cable for applying the brakes, a compression member surrounding the cable, a tubular casing secured to the compression member, an enlarged end on the cable, a member having a handle slidable in the casing and formed at one end with an opening receiving said enlarged end, and a slit washer between said enlarged end and said opening securing said cable in said slidable member, said casing being formed with a slot normally out of alinement with said washer through which said washer may be passed to disengage the cable.

12. In a vehicle brake applying mechanism, a cable for applying the brakes, a compression member surrounding the cable, a tubular casing, a slotted casting receiving said compression member and received by one end of the casing, brackets secured to the vehicle and receiving said end of the casing between them, said brackets, casting and casing being formed with alined openings, a bolt passing through said openings and securely clamping the brackets, casing, casting, and compression member together, an enlarged end on the cable, a member having a handle slidable in the casing and formed at one end with an opening receiving said enlarged end, and a slit washer between said enlarged end and said opening securing said cable in said slidable member, said casing being formed with a slot normally out of alinement with said washer through which said washer may be passed to disengage the cable.

13. A vehicle brake applying device comprising a cable for operating the brakes, a compression member surrounding the cable, a casing secured to the compression member, a member slidable within the casing secured to the cable, a handle on said slidable member, means for holding said slidable member in brake applied position, and means for releasing said slidable member, said device being provided with means having a horizontal pivot for securing it to the dash of the vehicle, and means having a horizontal pivot and adjustable longitudinally of the device for securing it to the instrument board of the vehicle.

JOHN SAMUEL IRVING.